（12）United States Patent
Grenier et al.

(10) Patent No.: US 6,898,177 B1
(45) Date of Patent: May 24, 2005

(54) ATM PROTECTION SWITCHING METHOD AND APPARATUS

(75) Inventors: Guy L Grenier, Ottawa (CA); Bruce D. Keats, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/392,454

(22) Filed: Sep. 9, 1999

(51) Int. Cl.[7] .............................................. H04L 12/56
(52) U.S. Cl. .................................. 370/225; 370/395.1
(58) Field of Search ................................ 370/216, 217,
370/218, 225, 229, 235, 236, 236.2, 351,
357, 389, 395.1, 907, 226, 227, 228; 709/238,
239

(56) References Cited

U.S. PATENT DOCUMENTS

| | | | |
|---|---|---|---|
| 5,764,651 A | * 6/1998 | Bullock et al. | 714/708 |
| 5,793,745 A | 8/1998 | Manchester | |
| 5,831,970 A | * 11/1998 | Arao | 370/227 |
| 5,974,045 A | * 10/1999 | Ohkura et al. | 370/241.1 |
| 6,247,051 B1 | * 6/2001 | Shimada | 709/224 |
| 6,256,292 B1 | * 7/2001 | Ellis et al. | 370/227 |
| 6,353,593 B1 | * 3/2002 | Chen et al. | 370/216 |
| 6,359,857 B1 | * 3/2002 | Ahmad et al. | 370/217 |
| 6,442,131 B1 | * 8/2002 | Kondo | 370/218 |
| 6,452,906 B1 | * 9/2002 | Afferton et al. | 370/242 |

FOREIGN PATENT DOCUMENTS

| | | |
|---|---|---|
| EP | 0824292 A | 2/1998 |
| WO | WO 9943184 A | 8/1999 |

OTHER PUBLICATIONS

Veitch et al. "A Distributed Protocol for Fast and Robust Virtual Path Restoration". IEEE Performance Engineering in Telecommunications Networks. Mar. 15–17, 1995. pp. 21/1 to 21/10.*

J. Anderson et al., "Vitural path group protection switching—A method for fast ATM network survivability," *Bell Labs Technical Journal*, Wiley, CA, vol. 2, No. 2, Mar. 1997, pp. 213–232.

P. Demeester et al., "Resilence in multilayer networks," *IEEE Communications Magazine*, Piscataway, N.J., vol. 37, No. 8, Aug. 1999, pp. 70–75.

P. A. Veitch et al., "An integrated restoration system for SDH–based ATM transport networks," *Global Telecom. Conference*, 1996, New York, pp. 1882–1886.

* cited by examiner

*Primary Examiner*—Chi Pham
*Assistant Examiner*—Derrick W Ferris
(74) *Attorney, Agent, or Firm*—Jeffrey Measures; Borden Ladner Gervais LLP

(57) ABSTRACT

A method of detecting signal degrade in an ATM network, and a network element using such method are disclosed. Signal degrade at the ATM layer of the network is detected by monitoring signal degrade at the physical layer of the network. In response, ATM cells indicative of the signal degrade may be generated at the ATM layer, and protection switching may be effected. Preferably, signal degrade at the physical layer may be monitored by determining a bit-error-rate at the physical layer. ATM alarm indication signal ("AIS") cells or ATM protection switching coordination protocol ("CP") cells may be generated to effect the protection switching.

25 Claims, 6 Drawing Sheets

1:1 PROTECTION SWITCHING

1+1 PROTECTION SWITCHING

VPG/VCG PROTECTION SWITCHING

ATM PROTECTION SWITCHING METHOD AND APPARATUS

FIELD OF THE INVENTION

The present invention relates to asynchronous transfer mode ("ATM") networks, and more particularly to a method and apparatus for detecting and reacting to defects on such a network.

BACKGROUND OF THE INVENTION

Many modern communication networks are adapted to detect and react to defects that may impair the transmission of data along such networks. Synchronous optical networks ("SONET"), for example, detect network defects and switch the routing of traffic within the network along differing physical paths in the presence of a defect, to ensure data traffic delivery between end points. Such switching is typically referred to as "protection switching".

Modern ATM networks, as for example detailed in International Telecommunication Union Recommendations ITU-T I.326, I.610, I.630, and I.732, the contents of all of which are hereby incorporated by reference, support similar protection switching in the presence of defects to provide a signal across the network in the presence of signal failure (signal fail—"SF"), or in the presence of a degraded signal (signal degrade—"SD"). SF is often manifested in loss of frames (LOF); loss of signal (LOS); or loss of cell delineation (LCD) at the physical layer carrying ATM traffic. As such ITU-T Recommendation I.630, suggests that a SF may be detected at the physical layer. SD, on the other hand, typically manifests itself in the presence of bit errors within the ATM signal. As such, ITU-T Recommendation I.630 suggests detecting SD at the ATM layer, by using performance monitoring ("PM") flows.

As should be appreciated, as the ATM layer relies upon the existing physical layer, faults detected at the ATM layer of the network are often detected some time after the same fault manifests itself at the physical layer. As such, the ATM layer is currently unable to detect and react to a SD condition as quickly as the physical layer might detect signs of the SD.

Accordingly, a method and apparatus that facilitates ATM layer protection switching with the speed of defect detection of the physical layer in the presence of SD is desirable.

SUMMARY OF THE INVENTION

In accordance the present invention, signal degrade on an ATM network is detected by monitoring signal degrade at the physical layer of the network. In response, ATM OAM cells indicative of the signal degrade may be generated at the ATM layer, and protection switching may be effected. Preferably, signal degrade at the physical layer may be monitored by determining a bit-error-rate at the physical layer. ATM alarm indication signal ("AIS") cells or ATM protection switching coordination protocol ("CP") cells may be generated to effect the protection switching.

In accordance with another aspect of the present invention, a network element for use in an ATM network, in which ATM traffic is carried on a physical network adhering to a physical layer protocol, is operable to switch traffic transported on a working entity of the ATM network to a protection entity on the ATM network. The network element includes a detector for monitoring an indicator of signal degrade of the working entity provided by said physical layer protocol.

Software may adapt an ATM network element to perform in accordance with the invention.

Other aspects and features of the present invention will become apparent to those of ordinary skill in the art, upon review of the following description of specific embodiments of the invention in conjunction with the accompanying figures.

BRIEF DESCRIPTION OF THE DRAWINGS

In figures which illustrate, by way of example only, preferred embodiments of the invention.

DETAILED DESCRIPTION

Figure 1:
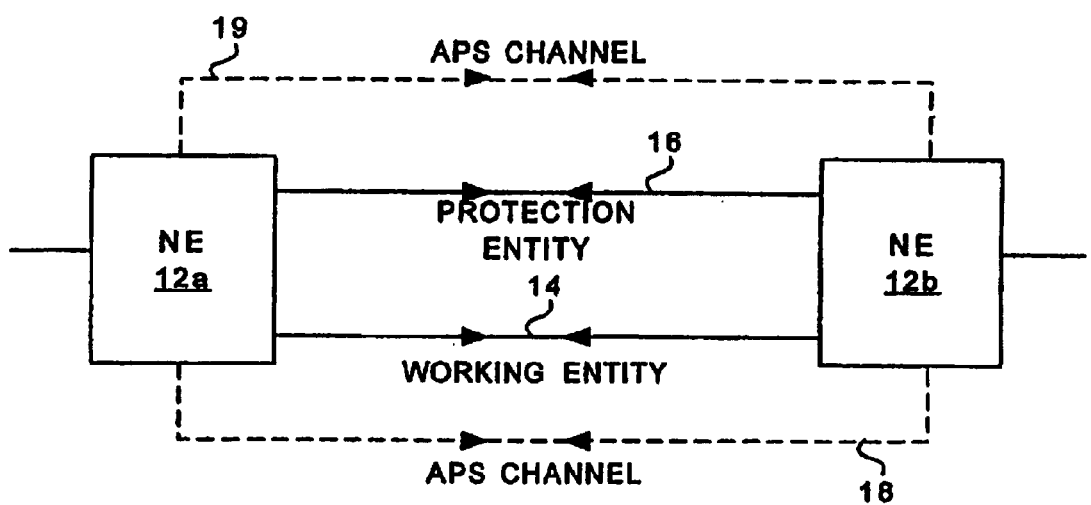
FIG. 1 is a simplified block diagram of two network elements ("NE"s) within an ATM network, exemplary of the present invention.

FIG. 1 illustrates ATM NEs 12a, 1b, (collectively, or individually 12) forming part of an ATM network, and exemplary of embodiments of the present invention. As will be appreciated, this ATM network will be formed upon a physical network, adhering to a physical layer protocol. This physical network, may for example, be a Synchronous Optical Network (SONET), as it is called in North America, or its European counterpart, a Synchronous Digital Hierarchy (SDH). It may also be a DSn based telephony network, adhering, for example to ITU Recommendation G.707, the contents of which are hereby incorporated by reference.

NEs 12 may be conventional ATM switches. NEs 12 may be end nodes with which traffic originates on the ATM network, or intermediate nodes connected between end nodes. As illustrated, NEs 12 are connected by at least two links (hereafter referred to as "entities") 14 and 16 capable of transporting payload traffic between NEs 12a and 12b. As will become apparent, third and fourth links 18 and 19, used to carry out-of band signaling messages may further connect NEs 12. Entities 14 and 16 and link 18 may directly connect NEs 12a and 12b, or alternatively couple NEs 12a and 12b by way of intermediate NEs (not illustrated). For simplicity of illustration, entities 14 and 16 and links 18 and 19 are illustrated as bi-directional links. Each entity 14 or 16, and links 18 or 19 however, is intended to represent two unidirectional links, with one carrying traffic from NE 12a to NE 12b, and the other from NE 12b to NE 12a. As will be appreciated each unidirectional link may be logically and physically separate from another associated unidirectional link.

NEs 12 exchange communications traffic in accordance with known ATM protocols. Specifically, prior to the exchange of payload traffic one or more virtual circuits, for the exchange of payload data is negotiated between end NEs on the network. Each virtual circuit is made up of a series of virtual channels ("VC"s) carried on physical connections between nodes on the networks. For illustration, each entity 14, 16 and link 18, 19 is intended to represent a VC, between nodes 12a and 12b. As will be appreciated, entities 14 and 16 could alternatively represent virtual paths ("VP"s) carrying multiple channels between nodes 12a and 12b. Preferably entities 14 and 16 are physically as well as logically separate. However, as will be appreciated, any two or more of entities 14, 16 and links 18 and 20 may follow the same physical path between NEs 12.

Traffic is exchanged between NEs 12 in packets. Each packet has fifty-three bytes and is known as a "cell". Each cell includes a five byte header. The cell header includes a payload type identifier ("PTI"), a virtual channel identifier ("VCI") associated with the cell, and a virtual path identifier ("VPI"). The VPI identifies a path between two nodes, while a VCI identifies a channel along such a path. All traffic passing from NEs 12a to 12b associated with a particular virtual circuit is transported on a virtual channel ("VC") between NEs 12a and 12b. If NEs 12a and 12b are adjacent, the VC may be uniquely identified by a VPI/VCI pair contained in cells transferred between NEs 12a and 12b. A routing table maintained at NE 12a, allows NEs 12a to switch all traffic arriving at the input of NE 12a in one VC to another VC associated with a unique VPI/VCI pair at the output of NE 12a. Similarly, NE 12b switches cells associated in a VC at the input of NE 12b to a single VC associated with a unique VPI/VCI pair at the output of NE 12b. Thereby all cells associated with a virtual circuit are routed along a defined route along the network. A virtual circuit between end-nodes on an ATM network is thus identified by a series of VPI/VCI pairs, across the network.

In addition to negotiating a primary traffic carrying channel between NEs 12a and 12b, a secondary channel may also be negotiated between NEs 12a and 12b. A primary channel is typically referred to as a working channel. As will be appreciated, secondary channels may be negotiated for a virtual circuit across the network, or for a portion of a virtual circuit across the network. A secondary channel is often referred to as a protection channel or entity, and may be used to carry traffic normally transported by a working channel, in the event of a defect.

ITU-T Recommendation I.630 details ATM layer protection switching, from a working channel to a protection channel, performed in response to the detection of certain defects. Such protection switching at the ATM layer should avoid contentions between any protection switching available at the physical layer of the network. Preferably, then, when SONET is used as a physical layer for an ATM network, SONET protection switching is disabled in order to avoid such contention.

As will be appreciated, by those of ordinary skill in the art, current ATM protocols contemplate 1:1 protection switching; 1+1 protection switching or m:n protection switching. That is, identical traffic may be carried along two entities as in 1+1 protection switching; alternatively traffic may be carried along one entity, with a second entity allocated to potentially carry traffic in the event of a defect, as in 1:1 protection switching; or traffic may be carried along m entities with n further entities allocated for protection switching. Moreover, this protection switching may be implemented by way of linear network element connections, as illustrated, in FIG. 1, or alternatively by way of ring or mesh connections between nodes (not illustrated).

A portion of an ATM network for which protection switching is supported is referred to as a protected domain within the ATM network. Protection switching may be supported for a single VC (ie. a single VPI/VCI pair) between two nodes ("VC protection switching"); or for all VCs within a virtual path ("VP protection switching").

Alternatively, multiple VPs or VCs may be protected as virtual path or virtual channel groups ("VPG"s or "VCG"s). As will be appreciated, protection for VPGs and VCGs is established for an entire VPG or VCG. That is, in the event a defect is detected on any working VP or VC within the group, traffic carried by the entire VPG or VCG may be switched to the established protection entity for the VPG or VCG.

In the illustrated embodiment of FIG. 1, entity 16 is intended to represent a protection channel for working entity 14.

Figure 2:
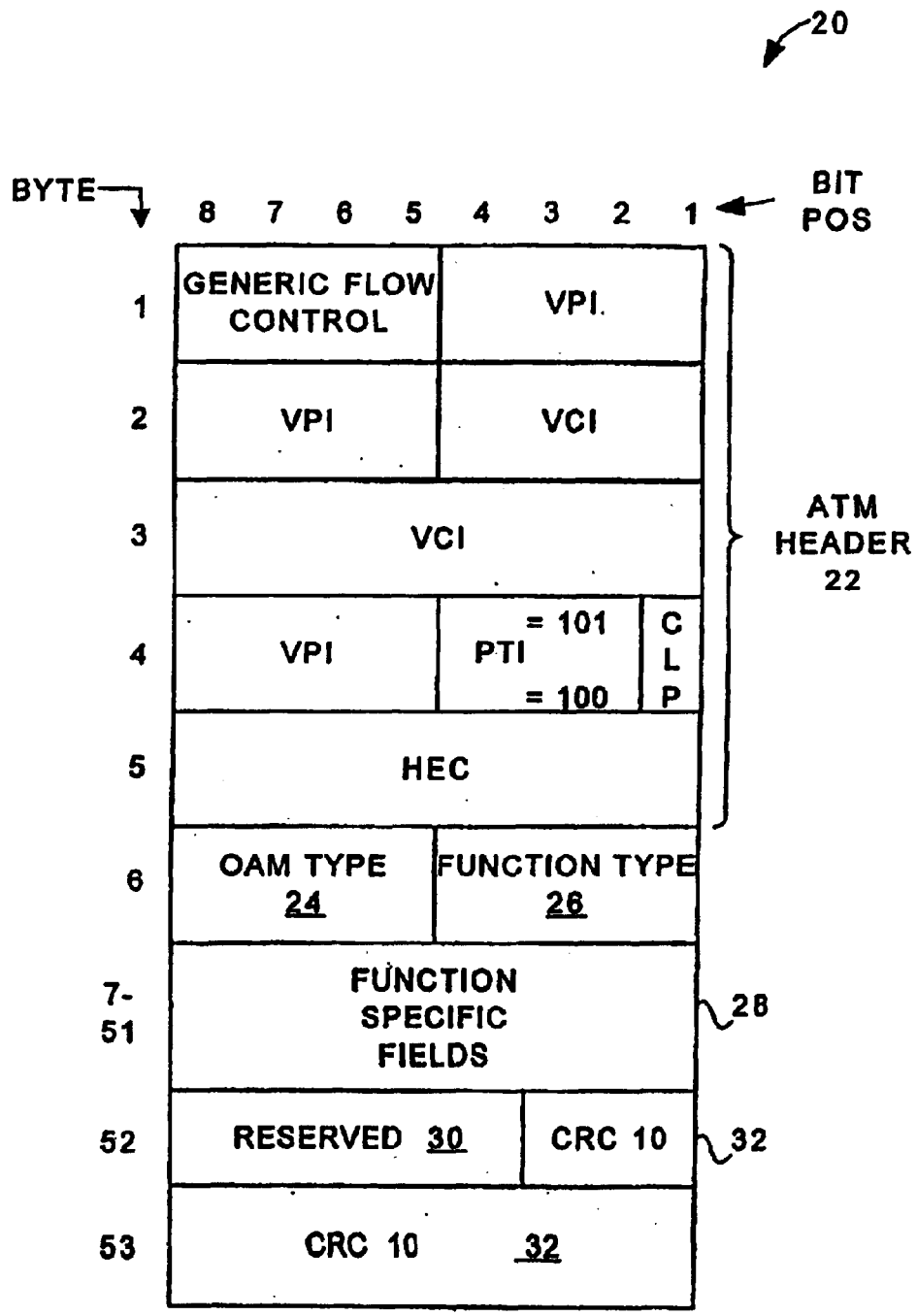
FIG. 2 illustrates the format of operations and management ("OAM") cells passed between the NEs of FIG. 1.

In addition to exchanging payload carrying cells, NEs 12a and 12b further exchange operations and management ("OAM") cells dedicated to the management of nodes 12 the associated ATM network. Currently, the format of OAM cells is defined in ITU Recommendations ITU-T I.610 and I.630. OAM cells are identified by the values of the PTI or VCI fields of the header. A generic OAM cell 20 is illustrated in FIG. 2. As illustrated OAM cells include a five byte ATM header 22; a four bit OAM type field 24; a four bit OAM function type field 26; forty-five bytes of function specific fields 28; six reserved bits 30; and a ten bit cyclic redundancy check field 32. As specified in ITU-T I.610 OAM cells specific to a VC may be identified by a PTI field value (binary) of 100 (4) or 101 (5). Sequential VC specific OAM cells passed within a VP or VC are referred to as F4 or F5 flows. F4 and F5 flows are carried in band for a specific channel and are identified by the VC's VPI/VCI pair contained in the OAM cell header 22. Alternatively, OAM cells specific to an entire VP are identified by VCI value of 3 or 4. VP specific OAM cells are carried in band for a specific VP identified by its VPI contained in the OAM cell header.

Protection switching, (ie. the switching of traffic from a working ATM entity to a protection entity) is accomplished through the exchange of OAM cells, generated in response to certain sensed conditions. Such OAM cells may be transported in-band along an affected VP or VC, and are identified by VPI/VCI pairs identical to the protected VC.

Alternatively, a dedicated out-of-band OAM channel used for protection switching may be provisioned and associated with a group of VPs or VCs. This dedicated OAM channel acts as a signaling channel and is referred to as an OAM ATM Protection Switching ("APS") channel, and is identified between NEs by its own unique VPI/VCI pair. In the embodiment of FIG. 1, links 18 and 19 may each carry an APS channel. Link 18 carries an APS channel associated with entity 14; link 19 carries and APS channel associated with entity 16.

OAM cells may be generated and inserted into a stream of ATM cells by any element of the ATM network, including NEs 12. As detailed in I.610, in the event certain failures are detected at the SONET layer, as manifested by LOS, LOF, or LCD, the NEs affected by the fault may exchange OAM cells, known as Virtual Path—Alarm Indication Signal ("VP-AIS") cells or Virtual Circuit—Alarm Indication Signal ("VC-AIS") cells and Remote Defect Indicator ("RDI") cells. OAM cells, as illustrated in FIG. 2, are specifically identified as AIS cells by OAM type value of 0001 (binary) contained in field 24, and a function type of 0000 (binary) contained in field 26. OAM AIS cells are generated and sent downstream within an affected VP or VC at fixed intervals by a source NE, indicating a defect in the channel or path.

Figure 3:
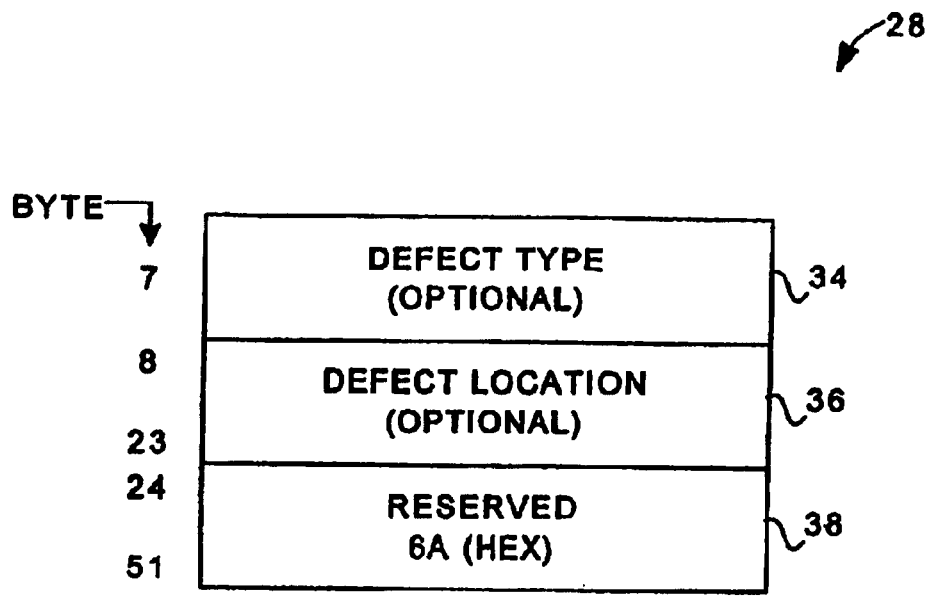
FIG. 3 illustrates the partial format of alarm indication signal ("AIS") cells passed between NEs of FIG. 1.

Typically one AIS cell is sent each second. At a sink NE receiving the AIS cell, an AIS state is declared in response to receiving an AIS cell. The sink NE, in response, sends RDI cells upstream to the source NE. RDI cells have the same format as AIS cells, with the exception of a function type of 0001 contained in field 26 (FIG. 2). Upon receipt of an RDI cell, the source NE assumes an RDI state. The function specific fields 28 of AIS/RDI cells are illustrated in FIG. 3. As illustrated the first byte of field 28 contains an optional one byte defect type field 34; a sixteen byte defect location field 36; and a twenty-eight reserved byte field 38, typically filled with bytes having a value of 6 A (Hex).

In 1+1 or 1:1 protection switching, the sink NE begins to use data received on the protection entity, immediately upon receipt of an AIS cell. In 1:1 protection switching, the source NE only begins to send traffic on the protection entity upon receipt of a CP cell. Upon receipt, the protection entity will be used to transport traffic between the source and sink NEs.

Figure 4:
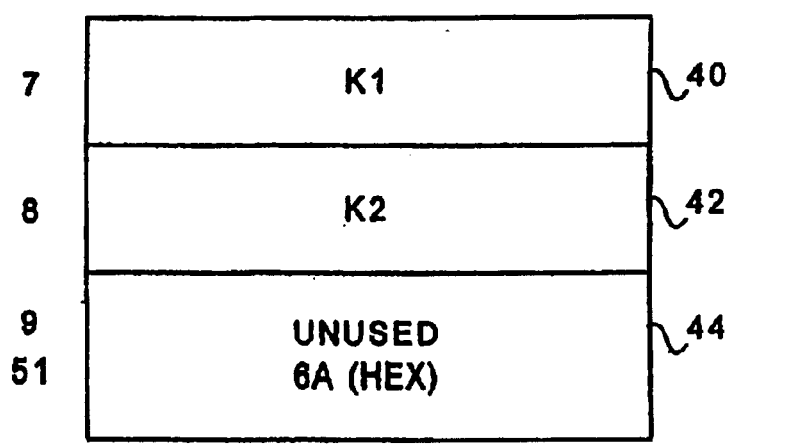
FIG. 4 illustrates the partial format of coordination protocol ("CP") cells passed between NEs of FIG. 1.

ITU-T Recommendation I.630 defines the use of APS coordination protocol ("CP") cells to effect ATM protection switching. CP cells are identified by an OAM function type of 0101 (binary) contained in field 24 (FIG. 2). Further the value of the function type field 26 indicates whether a CP cell is relevant to a VPG or VCG (function type=0000), or to an individual channel (function type=0001). The format of function specific fields 28 for CP cells is illustrated in FIG. 4. As illustrated fields 28 are characterized by two one byte K1 and K2 fields 40 and 42, followed by forty-three unused byte field 44, preferably populated with bytes having a value of 6 A (Hex). The current significance of many values for K1 and K2 is detailed in ITU Recommendation I.630. CP cells, unlike AIS cells, may be passed in-band within a VC without loss of traffic. Alternatively, C1 cells may be passed within an APS channel associated with a VPG or VPC. As detailed in ITU-T Recommendation I.630, CP cells are preferably generated and transmitted periodically, at five second intervals. Values of K1, K2 in fields 40 and 42 indicate the current perceived state of an entity at an NE. Thus, CP cells may signify that an NE has detected a defect within a VP or VC, or alternatively that no defect has been detected. Unlike an AIS cell, a CP cell indicates to a downstream NE the current state of an entity as perceived by an upstream NE. A CP cell need not indicate an alarm. Moreover, CP cells are not transmitted in place of traffic within a VP or VC, but instead are transmitted in addition to traffic within the VP or VC. In response to receiving a CP cell indicative of a defect condition, a downstream NE may begin receiving data on a protection entity. Similarly, for 1:1 or m:n protection switching, upon generating a CP cell indicative of a working entity defect, a source NE may transmit traffic on the protection entity.

As will be appreciated the state of each entity is maintained by an associated NE. A transition from one state to another may be effected by receipt of AIS cells (AIS state), or lack of receipt of AIS cells for a duration. Alternatively, a transition from one state to another may be effected by receipt of CP cells signifying a particular state.

ITU Recommendation I.630 further suggests use of F4 or F5 end-to-end or segment PM OAM flows to detect the degradation of working or protection entities. Specifically, a forward PM OAM cell may be inserted at the source NE and extracted at the sink NE. This PM cell may be sent after a block of user cells. The PM cell may contain a monitoring cell sequence number; the total number of user cells sent; and a block error code including a CRC calculation of the user cells. The sink NE counts the number of cells it receives and also calculates a CRC for the received cells. To determine if a signal degrade condition exists, it compares the count and CRC to the contents of the received PM cell. This, however, consumes network resources and does not allow for the fast detection of signal degrade conditions.

In practice signal degrade as detected by the ATM layer is caused largely by signal degrade in the physical layer. As such, all VPs or VCs following the same physical route should be similarly impacted the same. Monitoring individual ATM VCs following the same physical route, using performance OAM flows may thus be unnecessary.

Accordingly, in a manner exemplary of the present invention, a signal degrade indicator obtained by the physical layer is used to initiate ATM layer protection switching, responsive to signal degrade. That is, as will be appreciated by those of ordinary skill in the art, most physical layers of a communication network, such as for example the SONET layer, maintain their own indicators of signal degrade. Specifically, for example, as detailed in Bellcore G5-253-CORE SONET Transport System: Common Criteria; Rates and Format, Issue 2, December 1995, Revision 2, January 1999, the contents of which are hereby incorporated by reference, SONET maintains two indicators of bit errors as these are detected at the SONET path level. Specifically, the B3 byte of SONET path overhead layer, carries an eight bit, bit interleaved parity ("BIP") code calculated over a SONET STS path. Similarly, bits 1 and 2 of the SONET virtual tributary ("VT") path overhead V5 byte carries a two bit BIP code calculated over a virtual tributary. As will be appreciated by those of ordinary skill in the art, the SONET path level deals with the transport of services, including for example ATM cells between SONET path terminating equipment. As such, bit errors detected at this level will most closely reflect bit errors in the ATM layer. As described below, these already existing indicators of bit errors may be used to trigger ATM layer protection switching, in the presence of signal degrade. In the event another physical layer, such as a DSn layer, is used to carry ATM traffic, similar physical layer degrade measures may be used. For example, The C-bits (C1, C2, C3, C4, C5 and C6) of a DS1, as contained in a DS1 Extended Superframe carry a CRC-6 checksum that may be used to determine bit errors on DS1 traffic, as detailed in Transport Systems Generic Requirements (TSGR): Common Requirements, Bellcore GR-499-CORE, Issue 2, December 1998 the contents of which are hereby incorporated by reference. Similarly, CP-bits are used to determine bit errors in DS3 traffic.

Figure 5:
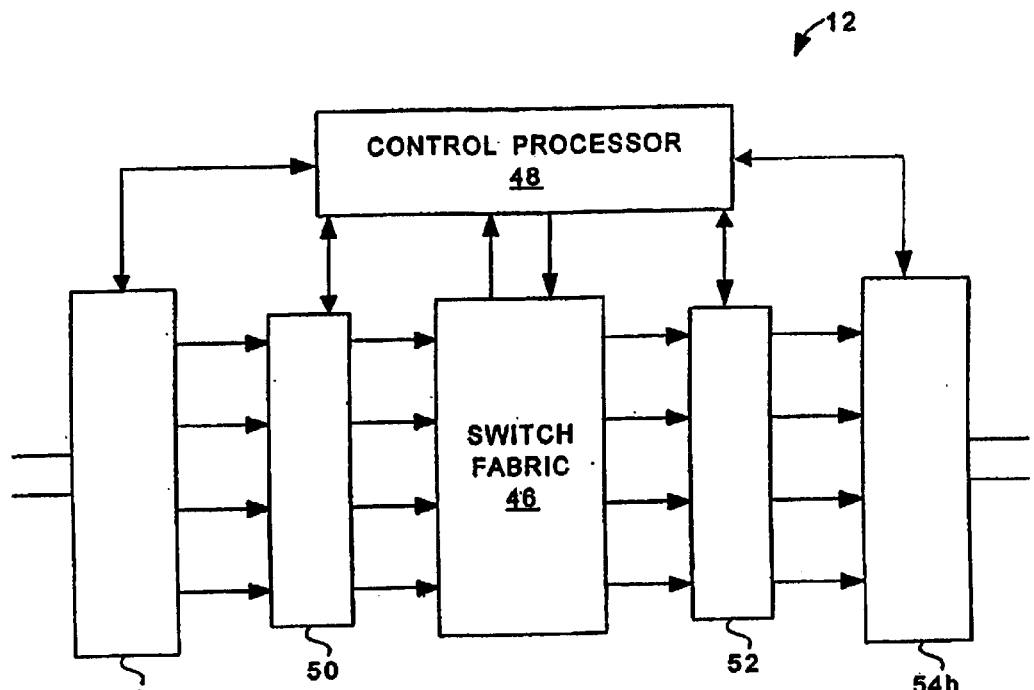
FIG. 5 is a simplified block diagram of an NE of FIG. 1.

An example architecture of any one of NEs 12 is therefore illustrated in FIG. 5. Practically, NE 12 may be formed as part of a conventional SONET add-drop multiplexer ("ADM"). As illustrated, NEs 12 each include an ATM switch fabric 46, functionally interconnected with an ATM processor 49; input port controllers 50, and output port controllers 52. Input port controllers 50 and output port controllers 52 are further interconnected with physical layer interface 54, illustrated in two portions 54a and 54b.

As will be appreciated by those of ordinary skill in the art, switch fabric 46 includes input and output ports interconnected with port controllers 50 and 52. Switch fabric 46 routes incoming ATM cells received at the input ports to desired output ports. Switch fabric 46 may be formed as a time division switch; a fully interconnected mesh; a crossbar or matrix switch; a Banyan switch fabric; a Batcher-Banyan switch fabric; an augmented Banyan switch fabric; a BeNEs switch fabric; a Clos switch fabric; a parallel switch fabric; or any other switch fabric known to those of ordinary skill in the art.

Input port controllers 50 receive streams of data from physical layer interface portion 54a and manage streams of input ATM cells. Input port controllers 50 may delineate cells; buffer incoming cells; align cells for switching; or identify output ports and establish a path across switch fabric 46 on the basis of information in true cell headers.

Output port controllers 52 similarly manage streams of output ATM cells from switch fabric 46. Output port controllers 52 may strip off self-routing Labels; buffer ATM cells awaiting transmission; align cells; and transfer cells to physical layer interface portion 54b.

ATM processor 48 controls the overall operation of NE 12, and may include a processor and storage memory (not specifically illustrated) including program instructions. ATM processor 48, in communication with input port controllers 50; switch fabric 46; output port controller 52; and physical layer interface 54 adapts NE 12 to operate in accordance with ATM protocols, and in manners exemplary of the present invention. As such, ATM processor 48 extracts and injects OAM cells from ATM streams. As will be appreciated, in order to achieve high speed operations, many of the control functions of ATM processor 48 may alternatively be formed in hardware.

Figure 6:
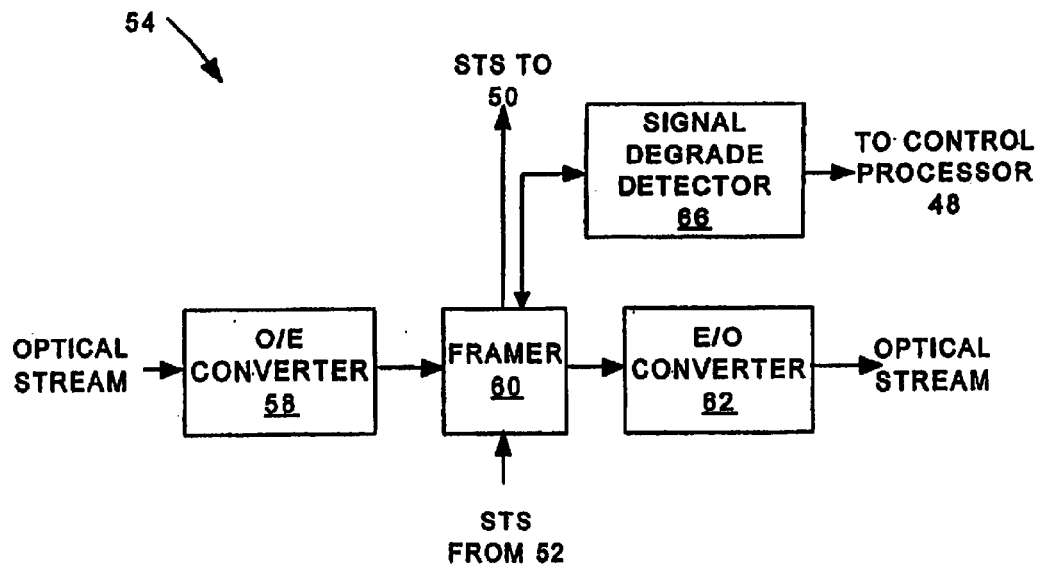
FIG. 6 is a simplified block diagram of a portion of the NE of FIG. 5.

An example physical layer interface 54, is illustrated in FIG. 6. In the example embodiment, physical layer interface 54 is a SONET/SDH interface, as detailed in ITU Recommendation G.707. Of course, as will be appreciated, SONET/SDH does not need to be used as the physical layer for the transport of ATM traffic between NEs 12 illustrated in FIG. 1. In the event another physical layer, such as for example, a telephony DS1, DS3, or other DSn physical layer is used, interface 54 will accordingly be an interface adapted to interface NE 12 to such a physical layer.

As illustrated, example physical layer interface 54 preferably includes an optical input port interconnected with an optical SONET carrying cable, and in communication with optical to electrical converter 58, that provides an electrical bit stream to SONET framer 60. SONET framer 60, in turn delineates the electrical bit stream, and provides an STS electrical stream to the input controller 54a.

Framer 60 further receives an input electrical stream from output port controller 52, packs this into SONET frames including overhead, and passes the resulting STS stream to electrical to optical converter 62. The output of electrical to optical converter is passed to an optical interface, which is in turn interconnected with another optical fibre.

Physical interface 54 further includes a signal degrade detector 66, exemplary of an embodiment of the present invention. Signal degrade detector may include its own processor and further a bit error rate calculator that may be formed from an application specific integrated circuit. Signal degrade detector 66 preferably monitors the B3 SONET path overhead byte, or the V5 VT overhead byte detailed above, and calculates a bit error rate for the SONET path level, in a manner understood by those skilled in the art. Several hardware implementations of this signal degrade detector currently exist. The signal degrade 66 detector is further preferably in communication with ATM processor 48 (FIG. 5) of NE 12 to provide indications of signal degrade once the calculated BER at the SONET layer exceeds some user defined threshold, as detailed below. A signal degrade detector may be implemented in hardware using integrated circuits, and is typically a sub-function of the SONET framer 60 (FIG. 6). As will become apparent, ATM processor 48 is adapted to generate ATM CP cells or AIS cells, as described below that are indicative of the signal degrade. These cells are further passed to a downstream NE.

Practically, signal degrade detector 66, may be formed as part of SONET framer 66, or otherwise as part of physical interface 54, in any manner appreciated by one of ordinary skill in the art. Signal degrade detector 66, need only monitor existing measurements of physical layer signal degrade to determine a BER and notify ATM processor 48 accordingly so that necessary ATM cells indicative of the signal degrade may be inserted into an output ATM stream.

Figure 7A:
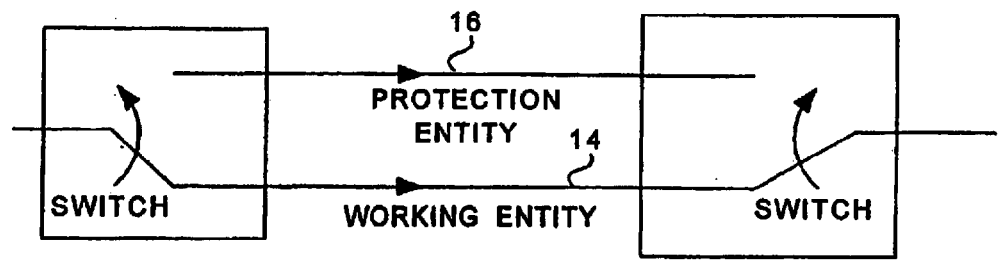
FIG. 7A is a simplified block diagram of two NEs configured for 1:1 protection switching.
Figure 7B:
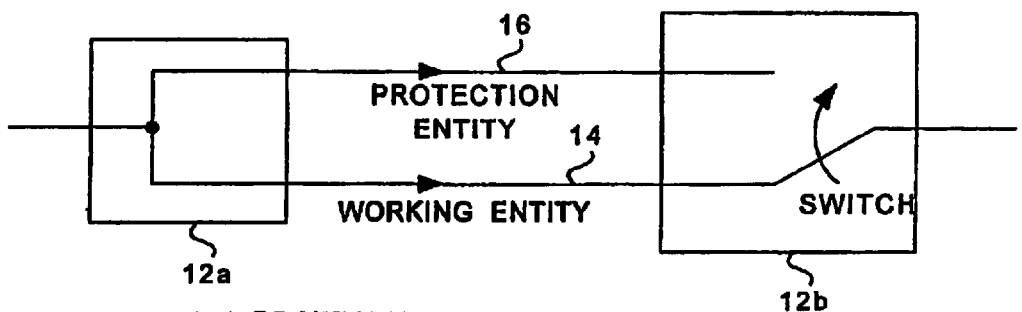
FIG. 7B is a simplified block diagram of two NEs configured for 1+1 protection switching.

In operation, NEs 12 may be configured to provide 1:1 or 1+1 VC protection switching as illustrated in FIGS. 7A and 7B, respectively. For simplicity of illustration, FIGS. 7A and 7B only illustrate protection switching in a single direction for traffic carried from NE 12a to NE 12b. Entity 14 acts as a working entity, while entity 16 acts as a protection entity for entity 14. In normal operation traffic is transported on entity 14. For 1:1 protection switching, entity 16 is provisioned but does not carry redundant traffic (FIG. 7A). For 1+1 protection switching entities 14 and 16 carry identical traffic (FIG. 7B). States representative of the entities 14 and 16 are maintained at NE 12a and 12b. In accordance with ITU-T Recommendation I.630), upon detection of a conventional defect, such as an LOC, LOD, LOS, NE 12a generates AIS cells (FIGS. 2 and 3); notes an AIS state fox entity 14; and passes the AIS cells to NE 12b on the VPI/VCI channel over entity 14. NE 12b, in turn, generates RDI cells, and passes them along the upstream channel of entity 14 to NE 12a. For 1:1 protection switching and assuming that the state of entity 16, as maintained by NE 12a, does not indicate a failure, NE 12a, also switches traffic previously carried on entity 14 to entity 16, as schematically illustrated in FIG. 7A. Upon receipt of traffic on entity 16, NE 12b utilizes this traffic in place of traffic on entity 14. For 1+1 protection switching as illustrated in FIG. 7B, traffic need not be switched between entity 14 and 16 at NE 12a.

At the same time, the signal degrade detector 66 (FIG. 6) of NE 12a monitors SONET overhead bytes B3 or V5 and determines a BER at the path level of the SONET layer. Upon noting a BER higher than a preset maximum, provisioned at monitor 66, the signal degrade detector 66 generates a trigger, that is provided to ATM processor 48 (FIG. 5). In the example embodiment, a BER threshold of $10^{-3}$ bits/second is preferably chosen. ATM processor 48, in turn generates ATM OAM cells indicative of signal degrade.

Preferably, NE 12a generates OAM CP cells as illustrated in FIGS. 2 and 4. In a manner exemplary of the present invention, fields 40 and 42 of each CP cell contains a status indicator indicating the signal degrade received from the SONET layer. Within the CP cell, the first four bits of field 40 are set to a value of 1000 (binary), indicating signal degrade of the working entity. For 1:1 protection switching and assuming that the state of entity 16 is not failed, NE 12a begins to transmit data carried on entity 14 on the protection entity carried by entity 16. NE 12b, upon receipt of the CP cell uses traffic received on entity 16 in favour of traffic on entity 14. NE 12a continues to monitor the signal degrade at the SONET layer of entity 14 and periodically generates and insert CP cells indicative of this signal degrade state of entity 14. NE 12a similarly monitors the signal degrade state of entity 16. In the event of signal degrade on entity 16, similar CP cells with the first four bits of field 40 populated with the value 1001, indicating signal degrade of the protection entity, are inserted into the channel carried by entity 16.

NEs 12a and 12b continue to transport data on entity 16 in favour of entity 14, until the state of entity 14 changes to indicate no further signal degrade; or until the state of entity 16 indicates a more severe condition on entity 16 than entity 14. That is in the event entity 16 assumes a signal fail state, traffic may be switched back to entity 14, even in the event of a signal degrade condition on entity 14.

As will be appreciated, if signal degrade is detected by a signal degrade monitor 66 at sink NE 12b, CP cells indicative of the signal degrade will initially be sent upstream to NE 12a. Moreover, in 1+1 protection switching configuration, NE 12b may switch to protection entity immediately upon detecting signal degrade on working entity 14.

Figure 7C:
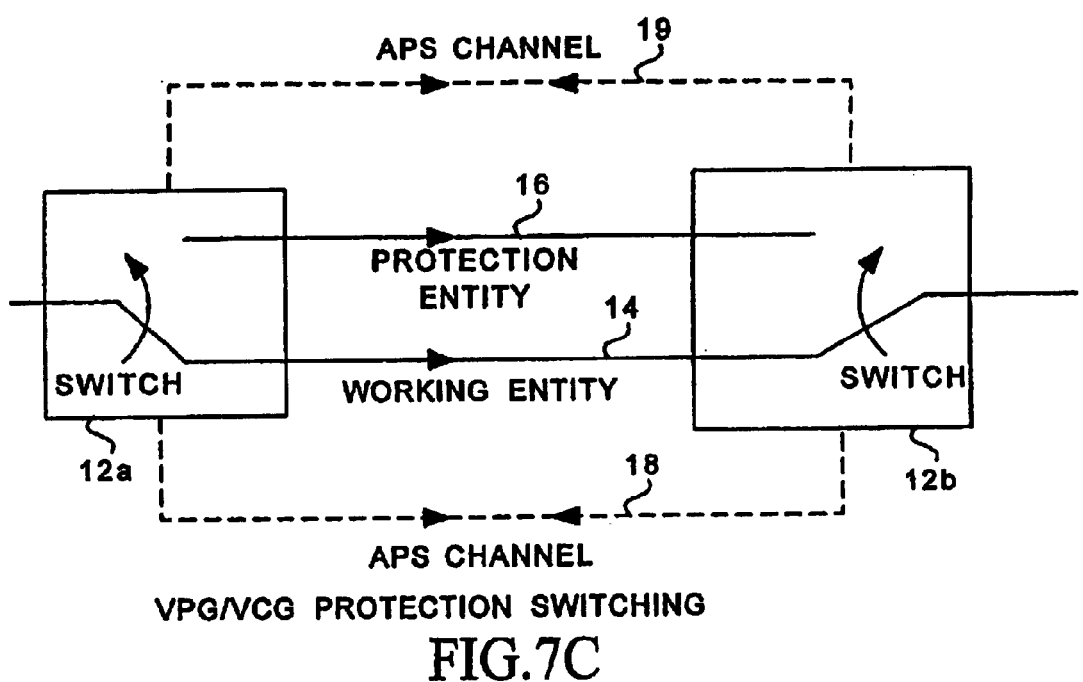
FIG. 7C is a simplified block diagram of two NEs configured for group protection switching.

In yet another configuration, NEs 12a and 12b may be configured to provide protection switching in VPGs or VCGs and thus provide protection switching, as illustrated in FIG. 7C. Again, for simplicity of illustration FIG. 7C only illustrates protection switching for traffic transported from NE 12a to NE 12b. An APS channel on link 18 carries OAM cells relevant to group protection switching for the group that includes entity 14. Again, entity 14 acts as a working entity, while entity 16 acts as a protection entity and is thus part of the protection group. In normal operation traffic is transported on entity 14. Entity 16 is provisioned but does not carry redundant traffic. Upon detection of a conventional fault, such as an LOC, LOD, LOS, NE 12a generates AIS cells and passes them to NE 12b on the APS channel on link 18 and on any channel within the VPG on entity 14. NE 11b in turn generates RDI cells, and passes them along the APS channel and any affected channel to NE 12a. NE 12b, also switches traffic previously carried on entity 14 to entity 16, as illustrated. Upon receipt of traffic on entity 16, NE 12b switches to receive this traffic in place of traffic on entity 14.

At the same time, signal degrade detector 66 of NE 12a monitors SONET overhead parity bytes B3 of V5 and determines a BER at the path level of the SONET layer. Upon noting a BER higher than a preset maximum, degrade monitor 66 generates a trigger, that is provided to ATM processor 48. In the example embodiment, a BER threshold of $10^{-3}$ bits/second is preferably chosen. Again, ATM processor 4B, in turn injects ATM OAM cells indicative of signal degrade. Preferably, NE 12a generates OAM AIS cells as illustrated in FIGS. 2 and 3 on the APS channel carried on link 18 associated with the working entity 14.

In a manner exemplary of the present invention, fields 34 of each AIS cell contains a newly defined value, SDType, indicating the signal degrade received from the SONET layer. Such AIS cell may thus be referred to as an AIS-SD cell. Field 36 may optionally identify the NE generating the OAM AIS-SD cell. Assuming that the state of entity 16 is not failed, NE 12a begins to transmit data carried on entity 14 on the protection entity carried by entity 16 NE 12b, upon receipt of the AIS-SD cell uses traffic transported on entity 16 in favour of traffic on entity 14. NE 12a continues to monitor the signal degrade state of entity 14 and periodically, preferably at one second intervals, generates and injects AIS-SD cells indicative of this signal degrade state of entity 14 on the APS channel on link 18. NE 12a similarly monitors the signal degrade state of entity 16. In the event of signal degrade on entity 16, AIS cells are generated on link 19. NEs 12a and 12b continue to transport traffic on entity 16 in favour of entity 14, until no AIS-SD cells are received for a defined duration, of preferably between 2.0 and 3.0 seconds or until another AIS cell indicates a more severe condition of entity 16 than entity 14. That is, in the event entity 16 assumes a SF state, traffic may be switched back to entity 14 even in the event of a signal degrade condition on entity 14. Unlike conventional AIS cells, and in a manner exemplary of the present invention, AIS-SD cells are preferably only carried on the established APS channel 18. In this way, the generation of AIS-SD cells does not impair the transport of traffic on entity 14.

As will be appreciated, while not explicitly described, protection switching for VP and VPGs will function similarly.

As will further be appreciated, CP cells could alternatively be passed on an APS channel to effect protection switching. Moreover, the particular format of CP cells and AIS cells is somewhat arbitrary, and may te varied, as understood by one of ordinary skill in the art.

Additionally, while the organization of hardware functional blocks, have been illustrated as clearly delineated, a person skilled in the art will appreciate that the delineation between blocks is somewhat arbitrary. Numerous other arrangements of hardware blocks are possible.

The above described embodiments, are intended to be illustrative only and in no way limiting the described embodiments of carrying out the invention, are susceptible to many modifications of form, size, arrangement of parts, and details of operation. The invention, rather, is intended to encompass all such modification within its scope, as defined by the claims.

What is claimed is:

1. In an ATM network, in which ATM traffic is carried on a physical network adhering to a physical layer protocol, a method of switching traffic transported on a working entity of said ATM network to a protection entity on said ATM network comprising:
   a) monitoring an indicator of signal degrade of said working entity provided by said physical layer protocol;
   b) in response to detecting a degraded signal as a result of said monitoring, generating ATM cells indicative of said signal degrade on said ATM network.

2. The method of claim 1, further comprising:
   c) in response to said ATM cells indicative of said signal degrade, receiving said traffic on said protection entity.

3. The method of claim 2, further comprising:
   d) in response to said ATM cells indicative of said signal degrade, transmitting said traffic on said protection entity from a source network element.

4. The method of claim 1, wherein said physical network comprises a synchronous optical network ("SONET").

5. The method of claim 4, wherein said monitoring comprises calculating a bit-error-rate from SONET path overhead.

6. The method of claim 5, wherein said calculating utilizes a parity check field within said SONET path overhead to determine said bit error rate.

7. The method of claim 6, wherein said ATM cells indicative of signal degrade are generated in response to said bit-error-rate exceeding a defined threshold.

8. The method of claim 7, wherein said ATM cells comprise ATM alarm indication signal ("AIS") cells.

9. The method of claim 8, wherein said AIS cells are transmitted from a network element detecting said signal degrade to a downstream network element using an ATM signaling channel.

10. The method of claim 9, wherein said ATM signaling channel comprises an ATM protection switching channel.

11. The method of claim 7, wherein said ATM cells comprise an ATM protection switching coordination protocol ("CP") cell.

12. The method of claim 11, wherein said CP cell is transmitted within one of said working entity and said protection entity.

13. A network element for use in an ATM network, in which ATM traffic is carried on a physical network adhering to a physical layer protocol, said network element operable to cause traffic transported on a working entity of said ATM network to be transported on a protection entity on said ATM network, said network element comprising:

a detector for monitoring an indicator of signal degrade of said working entity provided by said physical layer protocol, and generating a trigger indicative of signal degrade on said working entity to cause said network element to generate ATM cells indicative of said signal degrade on said ATM network.

14. The network element of claim 13, further comprising an ATM switch, in communication with an ATM processor, wherein said detector is in communication with said ATM processor, and wherein said ATM processor generates ATM cells indicative of signal degrade in response to said trigger.

15. The network element of claim 13, wherein said ATM cells comprise ATM alarm indication signal ("AIS") cells.

16. The network element of claim 13, wherein said ATM cells comprise an ATM protection switching coordination protocol ("CP") cell.

17. The network element of claim 15, wherein said AIS cells are transmitted to a downstream network element using an ATM signaling channel.

18. A network element for use in an ATM network, in which ATM traffic is carried on a physical network adhering to a physical layer protocol, said network element operable to switch traffic transported on a working entity of said ATM network to a protection entity on said ATM network, said network element comprising:

means for monitoring an indicator of signal degrade at said physical layer of said working entity provided by said physical layer protocol;

means for generating ATM cells indicative of signal degrade in response to said means for monitoring signal degrade at said physical layer.

19. Computer memory storing program instructions, adapting an ATM network element on ATM network in which ATM traffic is carried on a physical network adhering to a physical layer protocol, to:

a) monitor an indicator of signal degrade of a working entity on said ATM network provided by said physical layer protocol;

b) in response to detecting a degraded signal as a result of said monitoring, generate ATM cells indicative of said signal degrade on said ATM network.

20. An ATM cell comprising an alarm indication signal ("AIS"), embodied in a carrier wave to be transported on an ATM network, said cell comprising:

a) a field identifying said cell as an ATM AIS cell;

b) a field including an indicator of signal degrade on said network.

21. In a communications network in which ATM traffic is transported on a SONET network a method of switching traffic transported on a working ATM entity to a protection ATM entity, said method comprising:

a. monitoring an indicator of signal degrade of said working entity by monitoring an indicator of signal degrade in SONET overhead on said SONET network;

b. in response to detecting a degraded signal as a result of said monitoring, generating ATM cells indicative of the signal degrade to be transported to at least one adjacent node on said network.

22. The method of claim 21, further comprising:

c) in response to said ATM cells indicative of said signal degrade, receiving said traffic on said protection entity.

23. The method of claim 21 further comprising:

d) in response to said ATM cells indicative of said signal degrade, transmitting said traffic on said protection entity from a source network element.

24. The method of claim 21, wherein said monitoring comprises calculating a bit-error-rate from SONET path overhead.

25. The method of claim 24, wherein said calculating utilizes a parity check field within said SONET path overhead to determine said bit error rate.

* * * * *

UNITED STATES PATENT AND TRADEMARK OFFICE
CERTIFICATE OF CORRECTION

| | | |
|---|---|---|
| PATENT NO. | : 6,898,177 B1 | Page 1 of 1 |
| APPLICATION NO. | : 09/392454 | |
| DATED | : May 24, 2005 | |
| INVENTOR(S) | : Grenier et al. | |

It is certified that error appears in the above-identified patent and that said Letters Patent is hereby corrected as shown below:

On the title page, item (73), under "Assignee", in Column 1, Line 1, delete "Laurent" and insert -- Laurent, Quebec --, therefor.

In Column 2, Line 35, delete "1b," and insert -- 12b, --, therefor.

In Column 5, Line 33, delete "C1" and insert -- CP --, therefor.

In Column 6, Line 51, delete "49;" and insert -- 48; --, therefor.

In Column 7, Line 4, delete "true" and insert -- the --, therefor.

In Column 8, Line 21, delete "fox" and insert -- for --, therefor.

In Column 9, Line 21, delete "11b" and insert -- 12b --, therefor.

In Column 9, Line 33, delete "4B," and insert -- 48, --, therefor.

In Column 10, Line 4, delete "te" and insert -- be --, therefor.

In Column 10, Line 12, delete "limiting the" and insert -- limiting. The --, therefor.

Signed and Sealed this
Tenth Day of April, 2012

David J. Kappos
*Director of the United States Patent and Trademark Office*